United States Patent
Numazawa et al.

(10) Patent No.: US 10,232,888 B2
(45) Date of Patent: Mar. 19, 2019

(54) INTERIOR MEMBER

(71) Applicant: SUBARU CORPORATION, Tokyo (JP)

(72) Inventors: Koji Numazawa, Tokyo (JP); Yuji Aiuchi, Tokyo (JP); Fuminori Seino, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 61 days.

(21) Appl. No.: 15/643,272

(22) Filed: Jul. 6, 2017

(65) Prior Publication Data

US 2018/0086387 A1    Mar. 29, 2018

(30) Foreign Application Priority Data

Sep. 26, 2016    (JP) .................................. 2016-186571

(51) Int. Cl.
B62D 25/14    (2006.01)

(52) U.S. Cl.
CPC .................................... B62D 25/14 (2013.01)

(58) Field of Classification Search
CPC ......... A01B 35/20; A01B 43/00; A01B 49/02; B67D 9/02; E01C 11/126; H01L 2924/00014; B01D 29/111; B01D 35/30; B01D 29/15; B01D 29/58
USPC ......................................................... 296/70
See application file for complete search history.

(56) References Cited

U.S. PATENT DOCUMENTS

| | | | | |
|---|---|---|---|---|
| 4,530,517 | A | * | 7/1985 | Miyabayashi ........ B60R 21/045 180/90 |
| 5,997,030 | A | * | 12/1999 | Hannert .............. B60R 21/2165 280/728.3 |
| 6,644,722 | B2 | * | 11/2003 | Cooper ................... B29C 49/20 29/897.2 |
| 6,668,513 | B2 | * | 12/2003 | Roberts ................ B62D 25/145 296/205 |
| 6,705,671 | B1 | * | 3/2004 | Glovatsky ........... B60R 16/0215 174/117 FF |
| 6,837,518 | B2 | * | 1/2005 | Mullan ................. B60R 21/045 188/377 |

(Continued)

FOREIGN PATENT DOCUMENTS

JP    H06-305343 A    11/1994
JP    2003-146112 A    5/2003

(Continued)

OTHER PUBLICATIONS

Japanese Office Action, dated Jul. 17, 2018, in Japanese Application No. 2016-186571 and English Translation thereof.

(Continued)

Primary Examiner — Kiran B Patel
(74) Attorney, Agent, or Firm — McGinn IP Law Group, PLLC.

(57)    ABSTRACT

An interior member that is disposed in front of a driver's seat of a vehicle includes a main body and a rigid member. The main body has a tubular shape, extends in a width direction of the vehicle and forms an outer surface of the interior member. The rigid member is disposed on an inner surface of the main body and extends in the width direction of the vehicle. The rigid member supports the main body along the width direction of the vehicle.

8 Claims, 6 Drawing Sheets

(56) References Cited

U.S. PATENT DOCUMENTS

| | | | | |
|---|---|---|---|---|
| 6,843,521 B1* | 1/2005 | Oana | B62D 25/145 | 180/90 |
| 6,869,123 B2* | 3/2005 | Marks | B60R 21/045 | 280/752 |
| 6,955,394 B1* | 10/2005 | Reddig | B62D 25/142 | 296/193.02 |
| 7,128,360 B2* | 10/2006 | Scheib | B62D 25/142 | 296/70 |
| 7,284,789 B2* | 10/2007 | Wolf | B62D 25/145 | 180/90 |
| 7,604,278 B2 | 10/2009 | Penner | | |
| 7,607,691 B2* | 10/2009 | Arnold | B29C 33/52 | 280/751 |
| 7,731,261 B2* | 6/2010 | Wenzel | B29C 45/006 | 180/90 |
| 7,909,390 B2* | 3/2011 | Szoke | B62D 25/145 | 296/193.02 |
| 2004/0066053 A1* | 4/2004 | Fero | B60R 7/06 | 296/37.8 |
| 2005/0217913 A1* | 10/2005 | Sakamoto | B62D 25/14 | 180/90 |
| 2009/0174216 A1* | 7/2009 | Penner | B60K 37/00 | 296/72 |
| 2009/0266635 A1* | 10/2009 | Sato | B60K 35/00 | 180/90 |
| 2010/0101090 A1* | 4/2010 | Nakano | B22C 9/22 | 29/897.2 |
| 2010/0295285 A1* | 11/2010 | Dei | B60K 37/00 | 280/752 |
| 2012/0274090 A1* | 11/2012 | Carter | B62D 25/145 | 296/70 |
| 2013/0023192 A1* | 1/2013 | Niwa | B60H 1/0055 | 454/127 |
| 2014/0117700 A1* | 5/2014 | Noah-Navarro | B60H 1/0055 | 296/70 |
| 2015/0321560 A1* | 11/2015 | Webb | B60K 37/00 | 296/70 |

FOREIGN PATENT DOCUMENTS

| | | |
|---|---|---|
| JP | 2003-165323 A | 6/2003 |
| JP | 2009-078682 A | 4/2009 |
| JP | 2011-093499 A | 5/2011 |

OTHER PUBLICATIONS

Japanese Office Action dated Jan. 30, 2018 in Japanese Application No. 2016-186571 with an English translation thereof.

* cited by examiner

INTERIOR MEMBER

CROSS-REFERENCE TO RELATED APPLICATIONS

The present application claims priority from Japanese Patent Application No. 2016-186571 filed on Sep. 26, 2016, the entire contents of which are hereby incorporated by reference.

BACKGROUND

1. Technical Field

The present invention relates to an interior member, and particularly, to an instrument panel. In particular, the present invention relates to an interior member that suppresses a decrease in a load-bearing capacity in front of a driver's seat and a passenger's seat in the case where no steering support beam is provided and that contributes to a decrease in the weight of the instrument panel.

2. Related Art

A known steering member, which is one of interior members, has an inlet and an outlet for air from an air conditioner and has a hollow shape extending over the entire width of a vehicle cabin and a double structure (see Japanese Unexamined Patent Application Publication No. 2003-165323). The use of such a steering member enables, for instance, a decrease in cost, and a decrease in the total weight of the interior members at the front of the vehicle cabin.

Removal of a heavy component is an exemplary method for decreasing the weight of, for instance, an interior member. From the perspective of a decrease in the weight of the interior members such as an instrument panel and an internal part of the instrument panel at the front of the vehicle cabin, removal of a steering support beam, which is an instance of a heavy component, has been considered.

In many cases, the steering support beam is a metal member having a large diameter to sustain a load in the width direction of a vehicle in the case of a side impact. The instrument panel itself is a resin plate and has a low strength. Therefore, the steering support beam, which is disposed in the instrument panel independently of the outer surface of the instrument panel, provides the load-bearing capacity in front of the driver's seat and the passenger's seat in the vehicle cabin, and thus inner members disposed in the instrument panel are fixed to the steering support beam. The structure and the performance of the instrument panel are thus dependent on the steering support beam, and removal of the steering support beam is impractical.

SUMMARY OF THE INVENTION

In view of this, it is desirable to provide an interior member that suppresses a decrease in the load-bearing capacity in front of the driver's seat and the passenger's seat in the case where no steering support beam is provided and that contributes to a decrease in the weight of the instrument panel.

An aspect of the present invention provides an interior member that is disposed in front of a driver's seat of a vehicle. The interior member includes a main body that has a tubular shape, extends in a width direction of the vehicle and forms an outer surface of the interior member, and a rigid member that is disposed on an inner surface of the main body and that extends in the width direction of the vehicle. The rigid member supports the main body along the width direction of the vehicle.

The rigid member may include one or both of a tubular member that shares at least a part of the outer surface with the main body and a flange that extends inward from the inner surface of the main body.

An inner member disposed inside the main body may be fixed to the rigid member.

The main body may be divided into a plurality of sections along the width direction of the vehicle.

DETAILED DESCRIPTION

Outline of Basic Example

An interior member according to an example of the present invention will be described with reference to FIG. 1 to FIG. 3.

Figure 1:
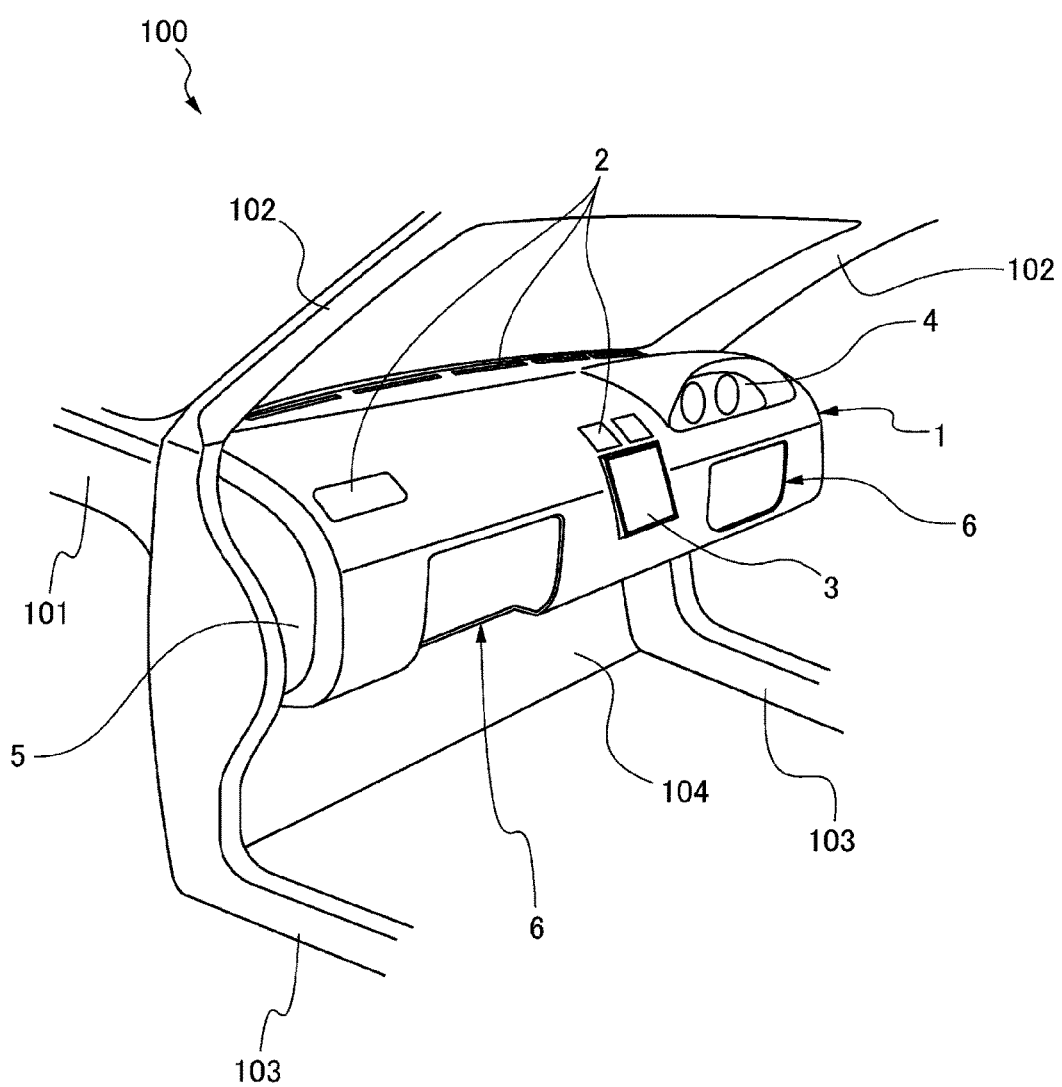
FIG. 1 is a schematic perspective view of a vehicle including an instrument panel that is an interior member according to an example of the present invention.

FIG. 1 is a schematic perspective view of a vehicle 100 including an instrument panel 1 that is the interior member according to an example of the present invention. FIG. 2 is a schematic perspective view of the interior member 1 in FIG. 1. FIG. 3 is a schematic sectional view of the interior member 1 taken along line III-III in FIG. 2.

As illustrated in FIG. 1, front side frames 101, front pillars 102, and side sills 103, as skeleton members of a vehicle body, are disposed on both the left-hand side and the right-hand side at the front of the vehicle cabin of the vehicle 100. The front side frames 101 extend from a front compartment of the vehicle 100 to the front end of the vehicle cabin. The front pillars 102 extend obliquely upward from the corresponding front side frames 101 toward the rear side and extend downward from the corresponding front side frames 101. In a region in which the front pillars 102 extend upward and downward, a flat toe board 104 is disposed and extends laterally between the front pillars 102 to divide the front compartment of the vehicle 100 from the vehicle cabin. The rear end of each front side frame 101 is coupled to the front end of the corresponding front pillar 102. Each side sill 103 extends in substantially the horizontal direction from the lower end of the corresponding front pillar 102 toward the rear side.

The instrument panel 1 is secured on the rear side of the toe board 104 so as to extend laterally between the front pillars 102. For instance, the instrument panel 1 is secured to either one of the front pillars 102 and the toe board 104. An interior member, such as the instrument panel 1, is fixed to the skeleton members assembled by joining or welding.

The instrument panel 1 has a space therein and can accommodate, for instance, equipment, wires, and an air bag. The instrument panel 1 has, for instance, outlets 2, a display 3, and a meter panel 4 in a surface layer thereof. Conditioned air supplied from a heating, ventilation, and air conditioning (referred to below as "HVAC") system disposed in the instrument panel 1 is blown through the outlets 2. The display 3 can display information such as navigation information and vehicle driving information. According to the example, a liquid crystal panel that enables, by touching, not only navigation operation but also air-conditioning operation is used. The meter panel 4 displays information such as speed information of the vehicle.

Lid members 5 for concealing, for instance, equipment inside the instrument panel 1 are fixed to both the left and right ends of the instrument panel 1. According to the example, a front portion of each lid member 5 is coupled to the skeleton members of the vehicle 100. The instrument panel 1 has openings 6. The openings 6 will be described later with reference to FIG. 2 and FIG. 3.

The structure of the instrument panel 1 will now be described in detail with reference to FIG. 2 and FIG. 3. In FIG. 2 and FIG. 3, the internal structure of the instrument panel 1 is illustrated with the lid members 5 detached.

Figure 2:
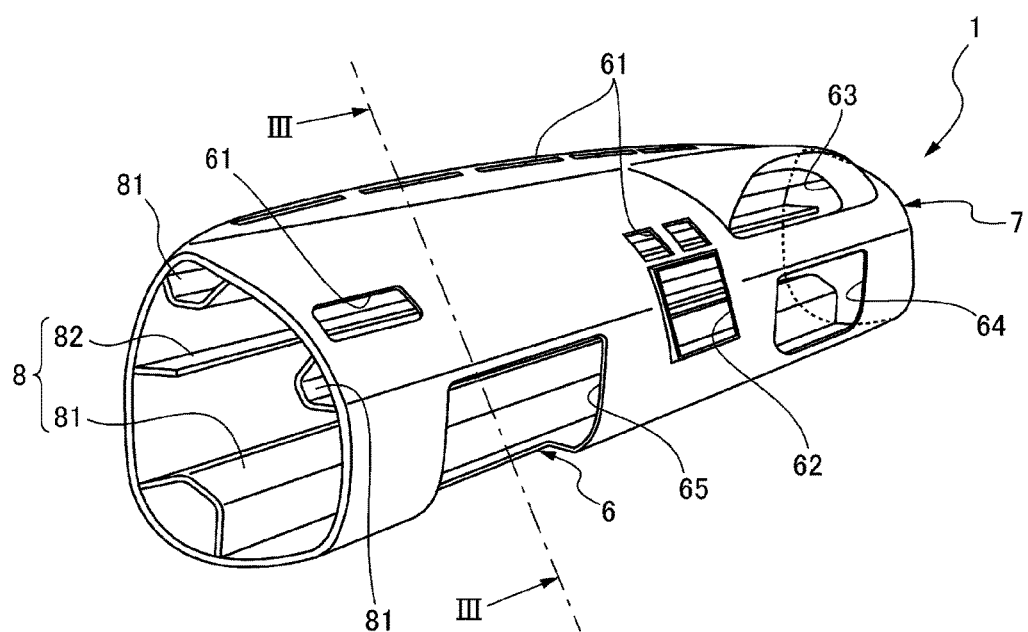
FIG. 2 is a schematic perspective view of the interior member in FIG. 1.

FIG. 2 is a schematic perspective view of the instrument panel 1 illustrated in FIG. 1. FIG. 3 is a schematic sectional view of the instrument panel 1 taken along line III-III illustrated in FIG. 2.

As illustrated in FIG. 2, the instrument panel 1 includes a main body 7 and a rigid member 8.

The main body 7 is a tubular member extending in the width direction of the vehicle. The main body 7 forms the outer surface of the instrument panel 1 and basically has a plate-like shape. As illustrated in FIG. 3, the sectional shape of the main body 7 in a direction perpendicular to the width direction of the vehicle is a shape obtained by partially deforming a substantially circular shape.

The main body according to the example of the present invention can have various sectional shapes in accordance with the design of the interior member in the vehicle cabin. Instances of the sectional shape can include a circular shape, an elliptical shape, and a polygonal shape.

As illustrated in FIG. 2, the main body 7 has the openings 6. Specifically, the openings 6 are classified into outlet openings 61, a display opening 62, a meter-panel opening 63, a driver's-seat-side opening 64, a passenger's-seat-side opening 65, and other openings.

At the outlet openings 61, louvers for adjusting the direction and volume of air through the outlets 2 are installed on the vehicle cabin side, and ducts for guiding the conditioned air to the outlets 2 are installed inside the instrument panel 1. At the display opening 62, a support member for securely supporting the display 3 fitted therein and a harness for supplying power to the display 3 and inputting and outputting appropriate electric signals are installed. At the meter-panel opening 63, a support member for securely supporting the meter panel 4 and a harness for supplying power to the meter panel 4 and inputting and outputting appropriate electric signals are installed.

In the driver's-seat-side opening 64, part of a steering device such as a steering column is inserted and disposed. In the passenger's-seat-side opening 65, a glovebox G that can accommodate an appropriate object is inserted. The arrangement of the openings illustrated in FIG. 2 corresponds to arrangement for a right-hand drive vehicle. However, in the case where an example of the present invention is used for a left-hand drive vehicle, the arrangement is opposite with respect to a symmetry axis passing through the center in the width direction of the vehicle.

The steering column and the glovebox G are instances of inner members disposed inside the main body according to the example of the present invention.

The rigid member 8 is disposed on the inner surface of the main body 7 and extends in the width direction of the vehicle. The rigid member 8 supports the main body 7 along the width direction of the vehicle. More specifically, the rigid member 8 includes tubular members 81 and a flange 82. The rigid member 8 is disposed to improve the rigidity of the instrument panel 1 and uses a rigid structure and/or a rigid material.

Each tubular member 81 is tubular and shares at least a part of the outer surface of the tubular body with the inner surface of the main body 7. The flange 82 is a substantially plate-like member and extends from the inner surface of the main body 7 toward the inside of the main body 7. The main body 7, which is a surface portion of the instrument panel 1, is typically formed of a resin material. The main body 7, the tubular members 81, and the flange 82 according to the example are permanently affixed to each other by, for instance, one-piece molding.

According to the example, as illustrated in FIG. 2, the driver's-seat-side opening 64 and the passenger's-seat-side opening 65 are formed at substantially the same height, and one of the tubular members 81 is disposed on an upper portion of the main body 7 near the openings 6. The inner members installed in the openings 6 of the instrument panel 1 are securely fixed to the tubular member 81 disposed near the openings 6.

The tubular members 81 and the flange 82 not only support the inner members but also can partition the inside of the main body 7 into regions in which the inner members are disposed. Specifically, the tubular members 81 can be used as passages through which the harness coupled to the corresponding equipment, which is the inner member, is laid. As illustrated in FIG. 2 and FIG. 3, since the flange 82 extends in substantially the horizontal direction, the inner members can be placed on the upper side of the flange 82, and other inner members can be suspended on the lower side thereof. The tubular members 81 and the flange 82 can be used, for instance, as partition plates for preventing the inner members from contacting with each other or as protective walls for suppressing production and transmission of radio noise due to friction, contact, or proximity between the inner members.

Not only the above-described inner members but also various other inner members are fixed to typical steering support beams, which support the inner members. That is, typical steering support beams have the function of supporting the inner members.

In contrast, according to the example, inner members are fixed to the tubular members 81. This enables the tubular members 81 to have the function of supporting the inner members, which steering support beams typically have.

According to the example of the present invention, the flange may be disposed near the openings, and the inner members may be fixed to the flange instead of the tubular member 81. In this case, a reinforcement such as a bracket or a rib may be disposed at a portion or near the portion of the flange to which each inner member is fixed, because the plate-like flange typically has a strength lower than the strength of the tubular member.

In the case of typical vehicles, the load-bearing capacity in front of the vehicle cabin in the width direction of each vehicle is ensured by the steering support beam. That is, in the case where a load along the width direction of each vehicle, for instance, a load due to side impact is applied in front of the vehicle cabin, the steering support beam, which stretches in the width direction of the vehicle, contributes to the load-bearing capacity. In this case, the load-bearing capacity is ensured by the steering support beam, that is, only one rod member. Accordingly, the steering support beam is formed as either one of a rod member and a tubular member having a certain degree of the diameter by using a metal material, which has a high strength. Brackets for installing the resin surface portion of the instrument panel facing the passenger side and many inner members are fixed to the steering support beam. As a result, the steering support beam is a heavy component.

In many cases, the surface portion of typical instrument panels is merely secured with the steering support beam by using, for instance, a bracket and is not reinforced to have the load-bearing capacity by itself. Conventionally, members for forming, for instance, regions and passages for the inner members are members different from the steering support beam, which ensures the strength. Consequently, the load-bearing capacity is ensured by only the steering support beam in a collision.

In contrast, according to the example, the load-bearing capacity over the entire instrument panel 1 along the width direction of the vehicle can be ensured by the main body 7 and the rigid member 8. In other words, the main body 7 has a strength derived from the tubular shape thereof, the main body 7 is supported by the rigid member 8 having sufficient rigidity, and therefore the components of the instrument panel 1 are formed integrally with each other. Accordingly, the strength along the width direction of the vehicle is easy to ensure. Consequently, the load-bearing capacity in front of the vehicle cabin in the width direction of the vehicle is unlikely to decrease or does not decrease as the example, in which no steering support beam is provided, is compared with the conventional case, in which the steering support beam is provided. In addition, the example, in which no steering support beam is provided, can contribute to a decrease in the weight of the instrument panel 1.

The rigid member 8 according to the example enables the optimization, integration, and rationalization of, for instance, the structure, arrangement, and shape of the instrument panel 1 and the inside thereof by partitioning regions in which the inner members are disposed. The rationalization of the structure of the instrument panel 1, for instance, enables the optimization of various components such as the bracket for fixation. Consequently, the weight of the instrument panel 1 can be further decreased.

MODIFICATION

Examples of the present invention such as modifications and a preferable example will now be described.

Figure 4:
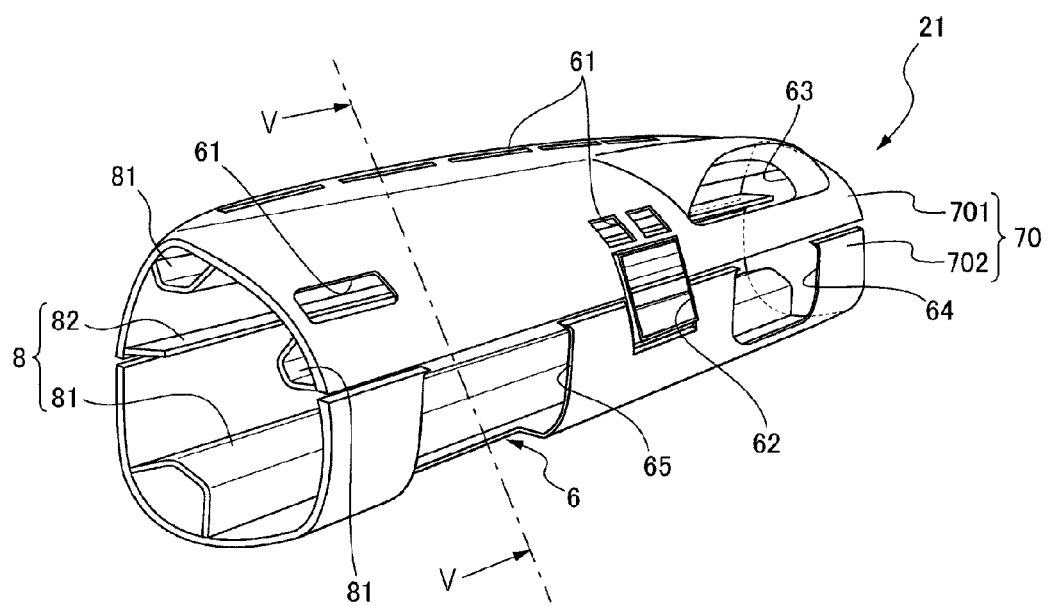
FIG. 4 is a schematic perspective view of an interior member according to another example of the present invention.
Figure 5:
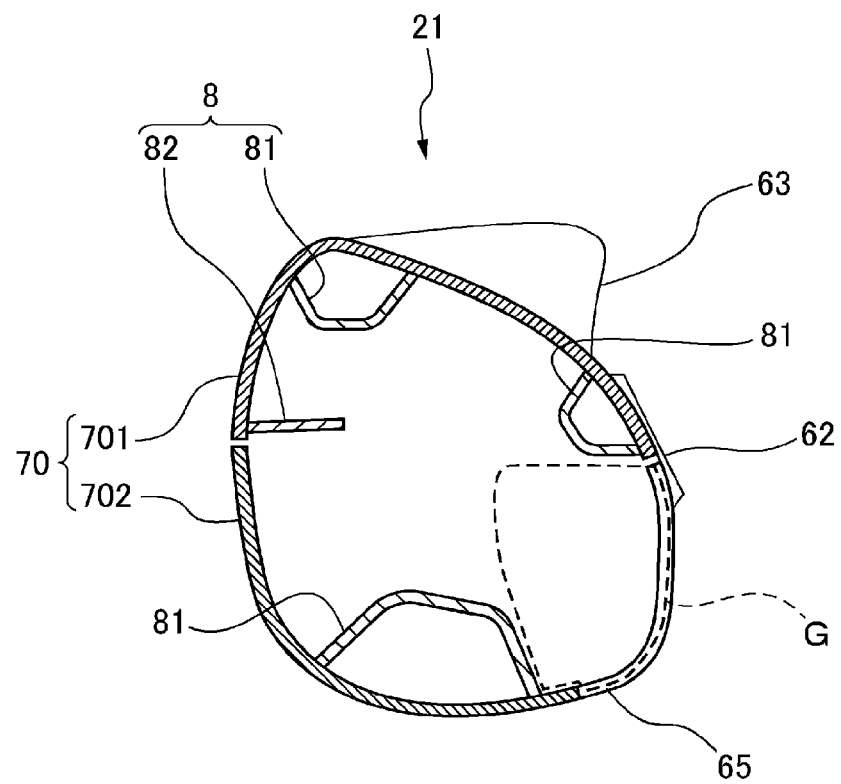
FIG. 5 is a schematic sectional view of the interior member taken along line V-V in FIG. 4.
Figure 6:
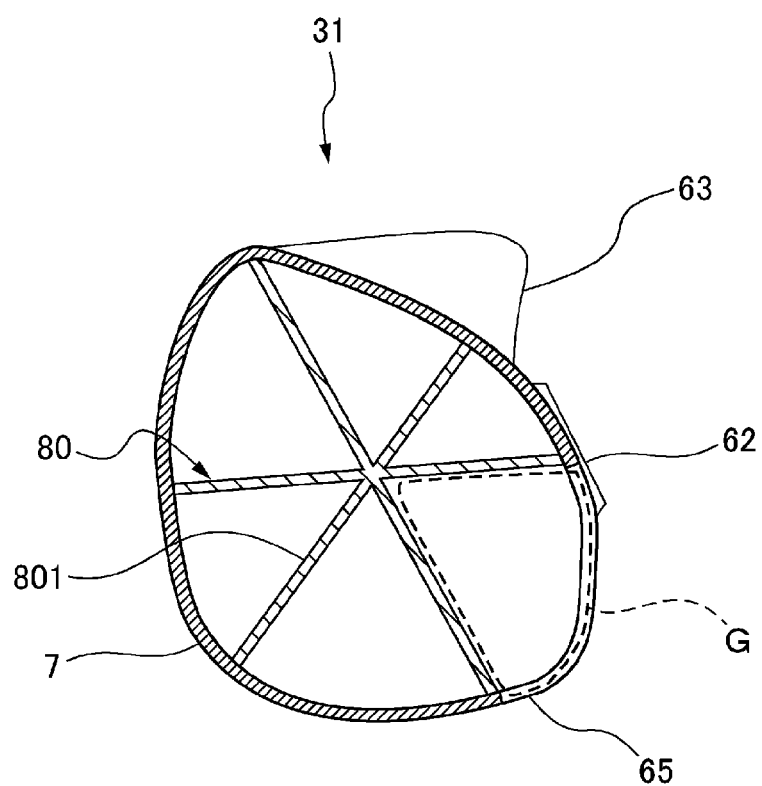
FIG. 6 is a schematic sectional view of an interior member according to another example of the present invention.

FIG. 4 to FIG. 6 illustrate modifications to the interior member according to the example of the present invention.

FIG. 4 is a schematic perspective view of an interior member 21 according to another example. FIG. 5 is a schematic sectional view of the interior member 21 taken along line V-V in FIG. 4. FIG. 6 is a schematic sectional view of an interior member 31 according to another example of the present invention. The components of the instrument panel illustrated in FIG. 4 to FIG. 6 that are common with the components of the instrument panel illustrated in FIG. 1 to FIG. 3 are designated by common reference numbers, and a detailed description thereof is omitted.

A difference between the instrument panel 21, illustrated in FIG. 4 and FIG. 5, which is an interior member, and the above-described instrument panel 1 is that a main body 70 is divided. Specifically, as illustrated in FIG. 4 and FIG. 5, the main body 70 is divided into an upper main body 701 and a lower main body 702 along the width direction of the vehicle.

According to a modification, a divided portion on the front side of the vehicle is located below the flange 82, and a divided portion on the rear side of the vehicle is located below one of the tubular members 81 and along the upper end of one of the openings 6. The divided portion is not necessarily located along the upper end of the opening 6 as in the case of the modification.

In the case where the instrument panel 21 is assembled into the main body of the vehicle, for instance, the lower main body 702 is first fixed to the main body of the vehicle. Subsequently, an appropriate inner member is disposed on the rigid member 8 disposed on the inner surface of the lower main body 702. At this time, appropriate inner members are also disposed on the rigid members 8 disposed on the inner surface of the upper main body 701. The upper main body 701 is fixed to the main body of the vehicle so as to cover the lower main body 702 from above. The upper main body 701 and the lower main body 702 are preferably secured to each other to be used stably as the instrument panel 21. In this case, the upper main body 701 and the lower main body 702 may include either one of a locking member and an engaging member and may be locked or engaged, the upper main body 701 and the lower main body 702 may be stuck together by using an adhesive between the divided portions of the main body 70 or may be welded, or other securing methods may be used.

The instrument panel 21 formed of the divided main body 70 is preferable, because the arrangement of the inner members is easier than in the case of the instrument panel 1 and ease of assembly is improved. The main body 70 divided along the width direction of the vehicle can prevent a decrease in the support performance of the main body 70 that the rigid member 8 provides along the width direction of the vehicle, and a decrease in the load-bearing capacity of the entire instrument panel 21 in the width direction of the vehicle.

A difference between an instrument panel 31, illustrated in FIG. 6, which is an interior member, and the above-described instrument panel 1 is that a rigid member 80 formed of tubular members 801 is used instead of the rigid member 8 formed of the tubular members 81 and the flange 82. Specifically, as illustrated in FIG. 6, the rigid member 80 includes the tubular members 801 arranged without a gap in the circumferential direction of a substantially circular shape that is the section of the main body 7.

According to a modification, the tubular members 801 are formed such that each tubular member 801 shares a side wall surface with another tubular member 801 adjacent thereto, and are arranged side by side without a gap in the circumferential direction. That is, the tubular members 801 partition the space in the main body 7 into regions extending in the width direction of the vehicle.

The instrument panel 31, in which the tubular members 801 are disposed without a gap, is preferable, because the adjoining tubular members 801 support each other, and the strength of the rigid member 80 along the width direction of the vehicle can thereby be larger than that in the instrument panel 1. The side wall surfaces of the tubular members 801 of the rigid member 80 are arranged so as to cross over the section of the instrument panel 31 in various directions, and this also improves the load-bearing capacity in a direction in which the sectional shape of the main body 7 changes, for instance, the front-rear direction of the vehicle or the vertical direction of the vehicle.

Various examples other than the examples illustrated in the figures can be used.

According to the above-described examples, the main body 7 and the rigid member 8 are formed by one-piece molding. However, the main body 7 and the rigid member 8 may be formed as separated bodies instead of using one-piece molding, and the bodies may be securely fixed to each other in the assembly of the interior member. In this case, the main body 7 and the rigid member 8 are preferably secured to each other at a securing location formed of a line, a surface, or a plurality of points along the width direction of the vehicle in order to make the strength of the instrument panel 1 in the width direction of the vehicle equal to the strength in the case of using one-piece molding. In the case where the components of the instrument panel are manufactured as separate bodies and assembled later, components having a shape that is more complex than the shape of those formed by one-piece molding can be formed, and accordingly, examples of the present invention are easy to be applied for interior members having various structures.

According to an example of the present invention, the main body and the rigid member may be formed of different materials. Specifically, for instance, a tubular member through which the harness or another member extends is formed of a material that can shield a radio wave, and a tubular member on which an inner member that needs temperature control is disposed is formed of an insulating material. In the case where the different materials are molded into one piece, one-piece molding may be used. In the case where one-piece molding is difficult to be used, the main body and the rigid member may be formed as separate bodies and secured by using, for instance, either one of a fastener, a fixture, and a bracket.

Figure 3:
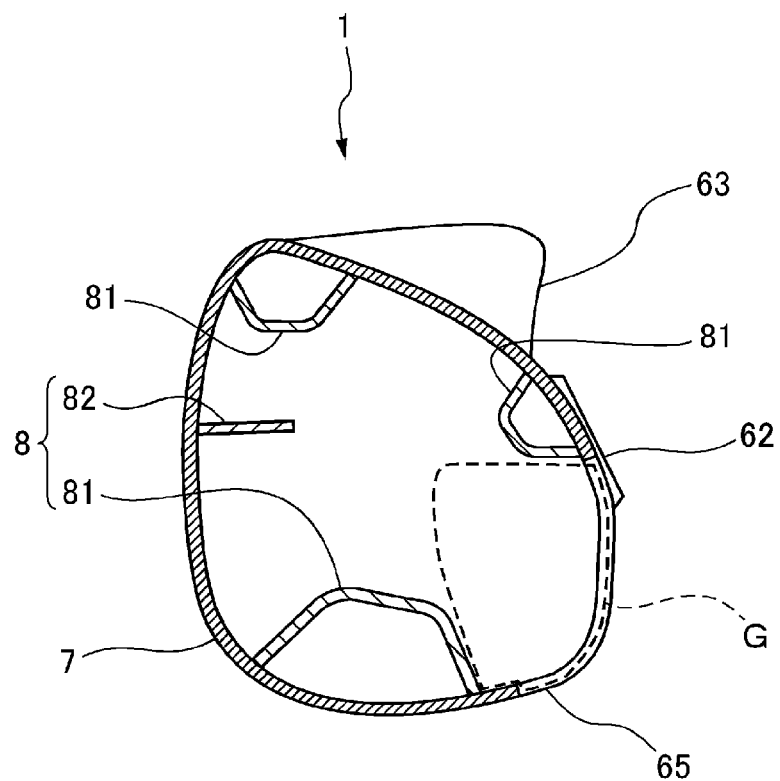
FIG. 3 is a schematic sectional view of the interior member taken along line III-III in FIG. 2.

According to an example of the present invention, in the case where the rigid member is linearly and continuously formed so as to extend between the left end and the right end of the vehicle along the width direction of the vehicle as in the case of the rigid member 8 illustrated in FIG. 2 and FIG. 3, the load-bearing capacity can be ensured continuously over the entire width of the vehicle, which is preferable.

According to an example of the present invention, the rigid member may be partially curved or bent. For instance, in the case where the driver's-seat-side opening 64, illustrated in FIG. 2, in which the steering column is inserted is formed at a position higher than that illustrated in FIG. 2, that is, nearer to the meter panel 4, the tubular member 81 on the driver's seat side may be curved upward to detour upward around the driver's-seat-side opening 64.

In some typical vehicles, the instrument panel is divided mainly into three sections: a driver's seat section, a center console section, and a passenger's seat section, which is characterized as the structure and design thereof. In this case, for instance, only the main body is preferably divided into three sections, and the rigid member is preferably formed as an elongated member extending between the left end and the right end of the vehicle without being divided.

In the case where the three divided sections of the main body are arranged in the width direction of the vehicle and joined, and the rigid member is fixed to the inside thereof, the rigid member can support the main body along the width direction of the vehicle.

Each of the main body and the rigid member may be divided into three sections. In this case, when the three divided sections of the main body and the rigid member are arranged in the width direction of the vehicle and joined, the three divided sections of the rigid member are securely coupled to each other over the entire width of the vehicle. This enables the entire rigid member to transmit a load applied along the width direction of the vehicle and suppresses a decrease in the load-bearing capacity.

Although the examples of the present invention made by the present inventors are described above, the present invention is not limited by the description and drawings constituting a part of the disclosure according to these examples. That is, it should be appreciated that all other examples and operating techniques made by those skilled in the art according to these examples are included within the scope of the present invention.

The invention claimed is:

1. An interior member that is disposed in front of a driver's seat of a vehicle, the interior member comprising:
   a main body that has a tubular shape and that extends in a width direction of the vehicle, the main body forming an outer surface of the interior member; and
   a rigid member that is disposed on an inner surface of the main body and that extends in the width direction of the vehicle,
   wherein the rigid member supports the main body along the width direction of the vehicle.

2. The interior member according to claim 1,
   wherein the rigid member comprises one or both of
      a tubular member that shares at least a part of an outer surface of the tubular member with the main body and
      a flange that extends inward from the inner surface of the main body.

3. The interior member according to claim 1,
   wherein an inner member disposed inside the main body is fixed to the rigid member.

4. The interior member according to claim 2,
   wherein an inner member disposed inside the main body is fixed to the rigid member.

5. The interior member according to claim 1,
   wherein the main body is divided into a plurality of sections along the width direction of the vehicle.

6. The interior member according to claim 2,
   wherein the main body is divided into a plurality of sections along the width direction of the vehicle.

7. The interior member according to claim 3,
   wherein the main body is divided into a plurality of sections along the width direction of the vehicle.

8. The interior member according to claim 4,
   wherein the main body is divided into a plurality of sections along the width direction of the vehicle.

\* \* \* \* \*